US006671944B2

(12) United States Patent
Holliday et al.

(10) Patent No.: US 6,671,944 B2
(45) Date of Patent: Jan. 6, 2004

(54) MULTIPURPOSE COAXIAL CABLE TOOL

(75) Inventors: Randall A. Holliday, Broomfield, CO (US); Gordon G. Schnare, Littleton, CO (US); Robert M. Parker, Aurora, CO (US)

(73) Assignee: International Communications Manufacturing Corporation, Denver, CO (US)

( * ) Notice: Subject to any disclaimer, the term of this patent is extended or adjusted under 35 U.S.C. 154(b) by 0 days.

(21) Appl. No.: 09/848,689

(22) Filed: May 4, 2001

(65) Prior Publication Data

US 2002/0162212 A1 Nov. 7, 2002

(51) Int. Cl.[7] .............................. B25B 7/00; B25F 1/00; B23P 19/00

(52) U.S. Cl. ............................ 29/564.4; 29/751; 7/107; 72/409.14

(58) Field of Search ........................ 29/751, 753, 33 M; 72/409.14; 7/107

(56) References Cited

U.S. PATENT DOCUMENTS

| | | | |
|---|---|---|---|
| 5,036,734 A | 8/1991 | Morrow | |
| 5,392,508 A | 2/1995 | Holliday et al. | |
| 5,743,131 A | 4/1998 | Holliday et al. | |
| 5,934,137 A * | 8/1999 | Tarpill | 72/409.14 |
| 5,941,120 A * | 8/1999 | Jee | 72/409.14 |
| 5,983,489 A * | 11/1999 | Jee | 29/751 |
| 6,089,913 A | 7/2000 | Holliday | |
| 6,293,004 B1 * | 9/2001 | Holliday | 29/751 |
| 6,363,560 B1 * | 4/2002 | Kesinger | 7/107 |
| 6,427,275 B1 * | 8/2002 | Hung | 7/107 |

* cited by examiner

*Primary Examiner*—A. L. Wellington
*Assistant Examiner*—Dana Ross
(74) *Attorney, Agent, or Firm*—John E. Reilly

(57) ABSTRACT

Hand held tools have been devised for preparing and crimping cables and specifically coaxial cables for television, a first form of tool made up of a low profile body having a main channel with a threaded crimping bolt for crimping circular fittings by axial compression onto the end of the cable, and a second form has a main channel which utilizes the same crimping bolt to carry out hexagonal crimping operations; and both forms have a channel for preparing each cable end for the crimping operation in which stripper blades are pivotally mounted for movement into engagement with the cable end to strip away one or more layers of the cable under the control of an adjustable limit stop which regulates the depth of penetration of each blade.

20 Claims, 10 Drawing Sheets

MULTIPURPOSE COAXIAL CABLE TOOL

BACKGROUND AND FIELD OF INVENTION

This invention relates to cable tools; and more particularly relates to a novel and improved multipurpose cable tool for stripping outer layers away from an end of the cable preliminary to connecting different selected fittings to the end of the cable and is particularly adaptable for use with coaxial cables.

The increasing popularity of cable television has led to the introduction of different sizes and types of coaxial cables and cable fittings. The differences in size or diameter are limited but nevertheless present problems in providing a tool that is suitable for use in assembling different sized fittings and cables without having to purchase a different tool for each specific size. Similarly, the do-it-yourselfer is inclined to manually strip the end of the coaxial cable "by guess and by golly" rather than to purchase a tool specific to the size to be stripped. Apart from the different sized fittings and cables, some fittings are designed for hexagonal crimping by means of radial compression and others designed for circular crimping with axial compression. For example, I have devised a number of crimping tools which apply an axially directed force to the fitting as opposed to radial compression, representative of same being U.S. Pat. No. 5,392,508 for AXIAL DEFORMATION CRIMPING TOOL and U.S. Pat. No. 5,743,131 for RATCHETED CRIMPING TOOL. Still further, in U.S. Pat. No. 6,089,913 for END CONNECTOR AND CRIMPING TOOL FOR COAXIAL CABLE, a pre-installed crimping ring is assembled by applying an axial force to the fitting.

It will be apparent from the above that there is an increasing need and demand for a tool for the do-it-yourselfer which enables preparation and assembly of different specific sized cables and fittings so as to avoid the expense of purchasing one tool for stripping a particular sized cable and another tool for assembling a particular sized fitting onto that cable. In this same connection, it is highly desirable that the tool be capable of compensating for differences in length of the coaxial cable fittings and that alternate forms of tool be capable of crimping hexagonal as well as circular type crimping sleeves in an accurate and dependable manner.

Another problem associated with cable connections is the proper preparation of the cable end to assure that a sealed connection is made with the fitting. In the case of coaxial cables, a dual cutting or stripping action is required in removing different layers from the end of the cable, and the thickness or depth of cut will vary with different cable sizes and types. Stripping tools have been devised in the past and, for example, reference is made to U.S. Pat. No. 5,036,734 for CABLE STRIPPING TOOL which discloses a hand tool designed for a dual stripping action for a particular size cable but is not conformable for cutting different sizes and types of cables without the necessity of replacing the blades. In particular, it is desirable that the same tool provided for connection of different sized cables can be employed to prepare different sized cables for connection; also, that the tool body or housing afford the necessary leverage to carry out manual stripping and crimping operations on a variety of different sized cables and cable fittings.

SUMMARY OF THE INVENTION

It is therefore an object of the present invention to provide for a novel and improved cable tool for crimping a fitting onto the end of a cable.

Another object of the present invention is to provide for a novel and improved coaxial cable tool for crimping different sized fittings and cables together in a reliable and efficient manner; and further wherein the tool is capable of stripping the cable end in preparation for the crimping operation.

It is a further object of the present invention to provide for novel and improved multipurpose coaxial cable tools for stripping different sized cable ends and crimping different sized fittings both of the circular and hexagonal type.

It is an additional object of the present invention to provide for a novel and improved multipurpose coaxial stripping and crimping tool which is economical to manufacture, is comprised of a minimum number of parts of lightweight construction, is extremely compact yet affords sufficient leverage for efficiently stripping and crimping different sized cables and cable fittings together.

In accordance with the present invention, there has been devised a multipurpose coaxial cable tool wherein the coaxial cable is loosely assembled along with a cable fitting at one end of the cable and a crimping ring is loosely assembled over a portion of the cable fitting, the tool comprising in combination an elongated body having a channel extending lengthwise of the body and terminating in a cable-receiving opening at one end and a crimping member-receiving opening at an opposite end of the channel, anchor means including an end stop mounted in the channel for limiting axial movement of the crimping ring toward the cable-receiving opening, and a crimping member insertable through the opposite end of the channel into engagement with the end of the cable, and force-applying means for axially advancing the crimping member toward the end stop in order to cause the crimping ring to contract the sleeve into crimping engagement with the cable end. In the tool described, preferably the crimping member is in the form of an elongated stem insertable through the crimping member-receiving opening, and the force-applying means is defined by a fixed threaded portion in the channel which threadedly engages the stem so that the stem is axially movable through the channel in response to relative rotation between the stem and body. In addition, the threaded stem has a cable-engaging tip which is journaled at the leading end of the stem so as to bear against the crimping member and apply an axial force in response to rotation of the stem.

In order to carry out hexagonal crimping operations, and second form of tool includes a second channel extending transversely of the first channel with crimping dies releasably positioned in the second channel and one of the dies disposed in the path of travel of the threaded stem to impart a radial crimping action directly to the cable sleeve placed between the die members.

Both forms of tools also incorporate a stripping apparatus which employs the same housing or body to accommodate different sized cable ends and to strip the layer or layers surrounding the conductor pin of the cable to the desired thickness in preparation for the crimping operation. Preferably, this is achieved by an adjustable limit stop on the housing which regulates the depth of penetration of one or more blades on a movable jaw into the cable end in accordance with the size of cable to be stripped and without necessity of adjusting or replacing the stripping blades themselves.

There has been outlined the more important features of the invention in order that the detailed description thereof that follows may be better understood, and in order that the present contribution to the art may be better appreciated.

There are, of course, additional features of the invention that will be described hereinafter and which will form the subject matter of the claims appended hereto. In this respect, before explaining preferred embodiments of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS

Figure 1:
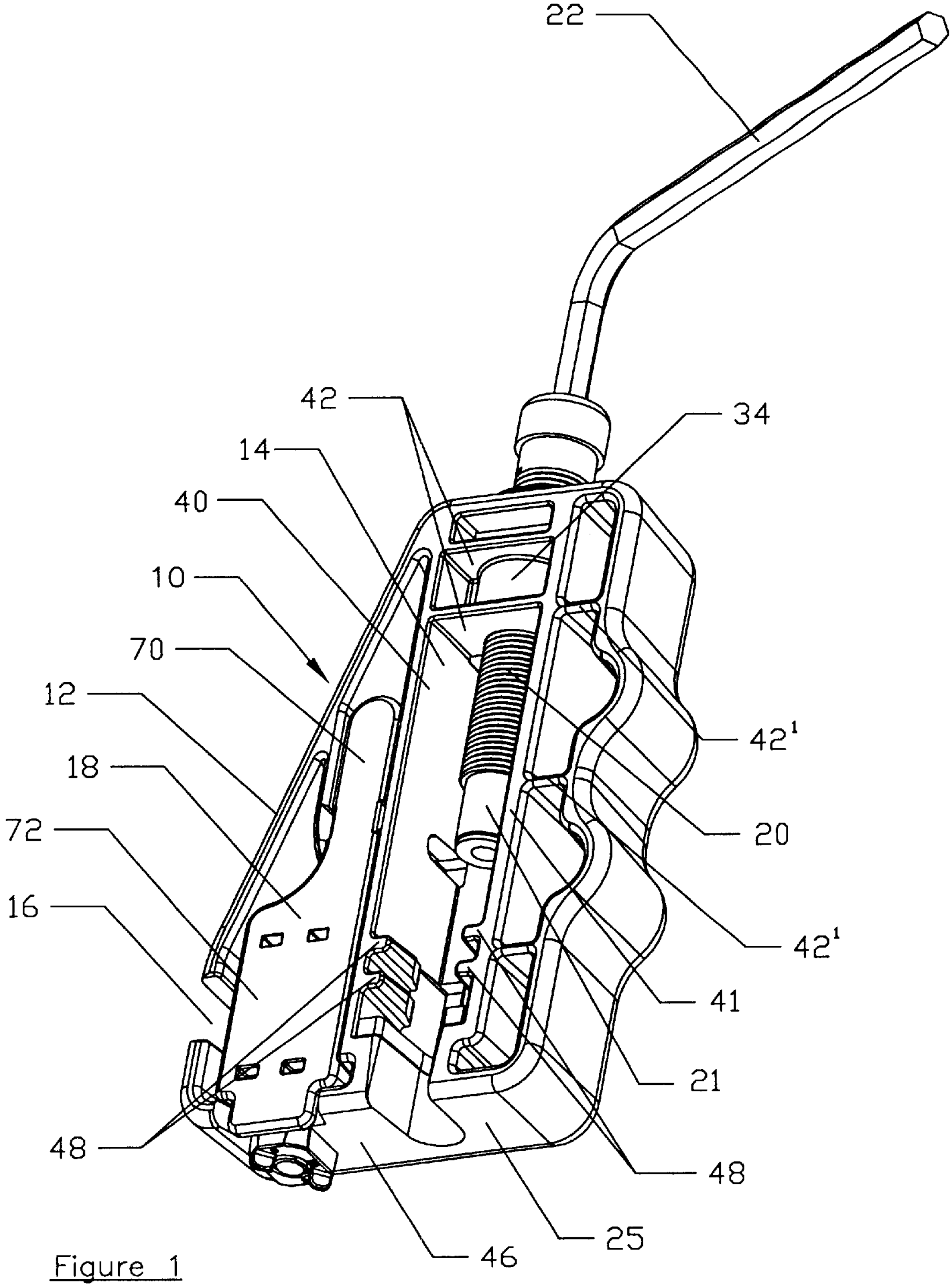
FIG. 1 is an isometric view of a first preferred form of tool in accordance with the present invention.
Figure 2:
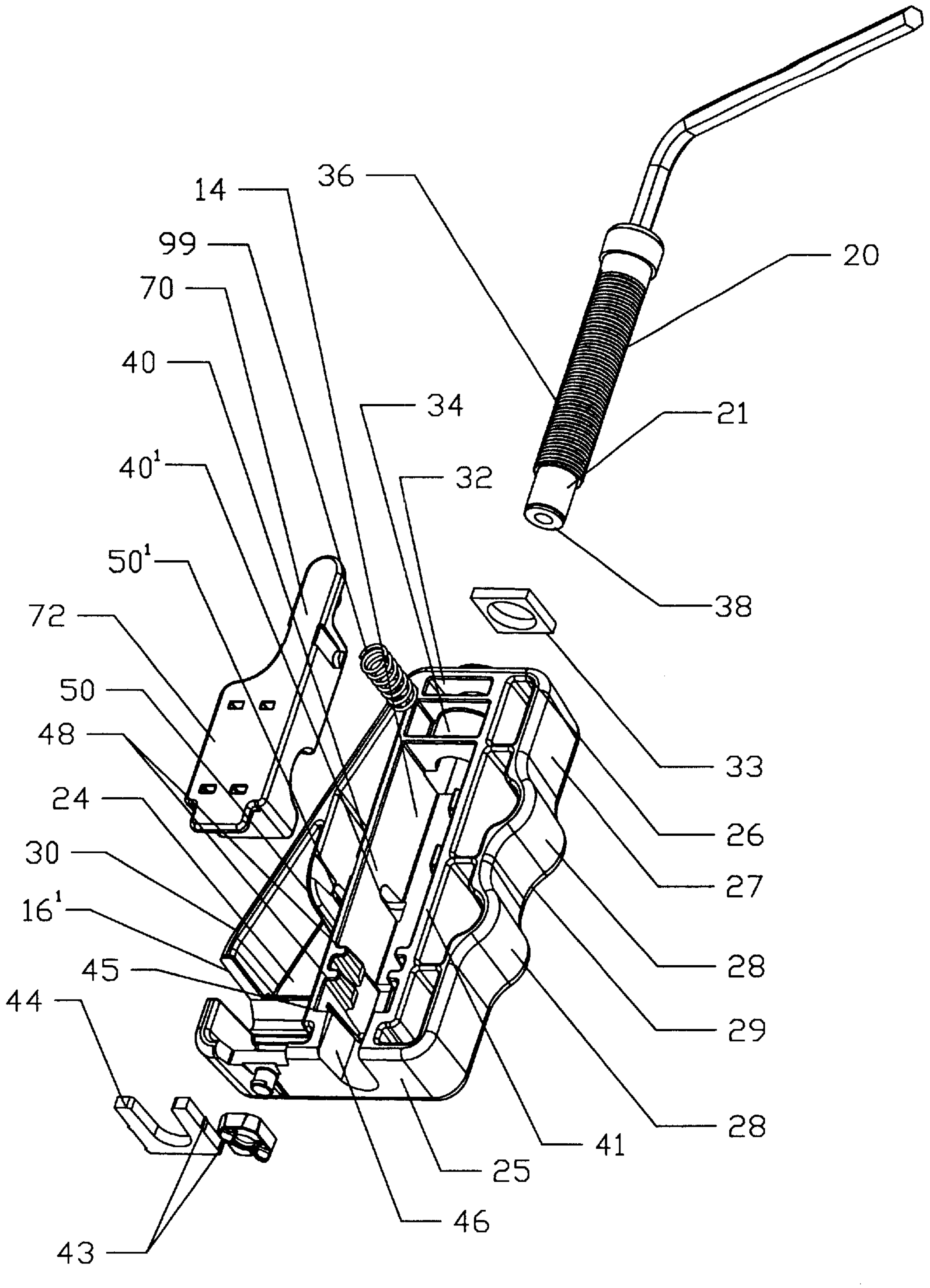
FIG. 2 is an exploded view of the preferred form shown in FIG. 1.

Referring in more detail to the drawings, there is illustrated in FIGS. 1 to 4 a first preferred form of multipurpose tool 10 which is broadly comprised of an elongated body or housing 12 having a central or main channel 14 for crimping cylindrical connectors in a manner to be described and a side channel 16 covered by a pivotal jaw member 18 for stripping connector ends in preparation for the crimping operation. In addition, a compression bolt 20 is mounted in the channel 14 for threaded advancement under the control of a handle 22. Preferably, the handle 22 is an Allen® wrench inserted into a complementary socket 23 in the end of the bolt 20.

Considering more detail the construction of the body 12, it is made up of a bottom panel 24 with opposite end walls 25 and 26 and the channel 14 extending between the end walls. A first side wall 27 includes lateral protuberances 28 forming a groove 29 therebetween to define finger grips along that side. An opposite side wall 30 diverges laterally away from the end wall 26 toward the opposite end wall 25 and is recessed adjacent to the end wall 25 so as to define an entrance to a stripper channel 16. The degree of divergence of the side wall 30 may vary but preferably is on the order of 20° to 30° so as to afford sufficient length for the stripper channel 16 to accommodate the end of a cable to carry out the stripping operation in a manner to be described.

Figure 3:
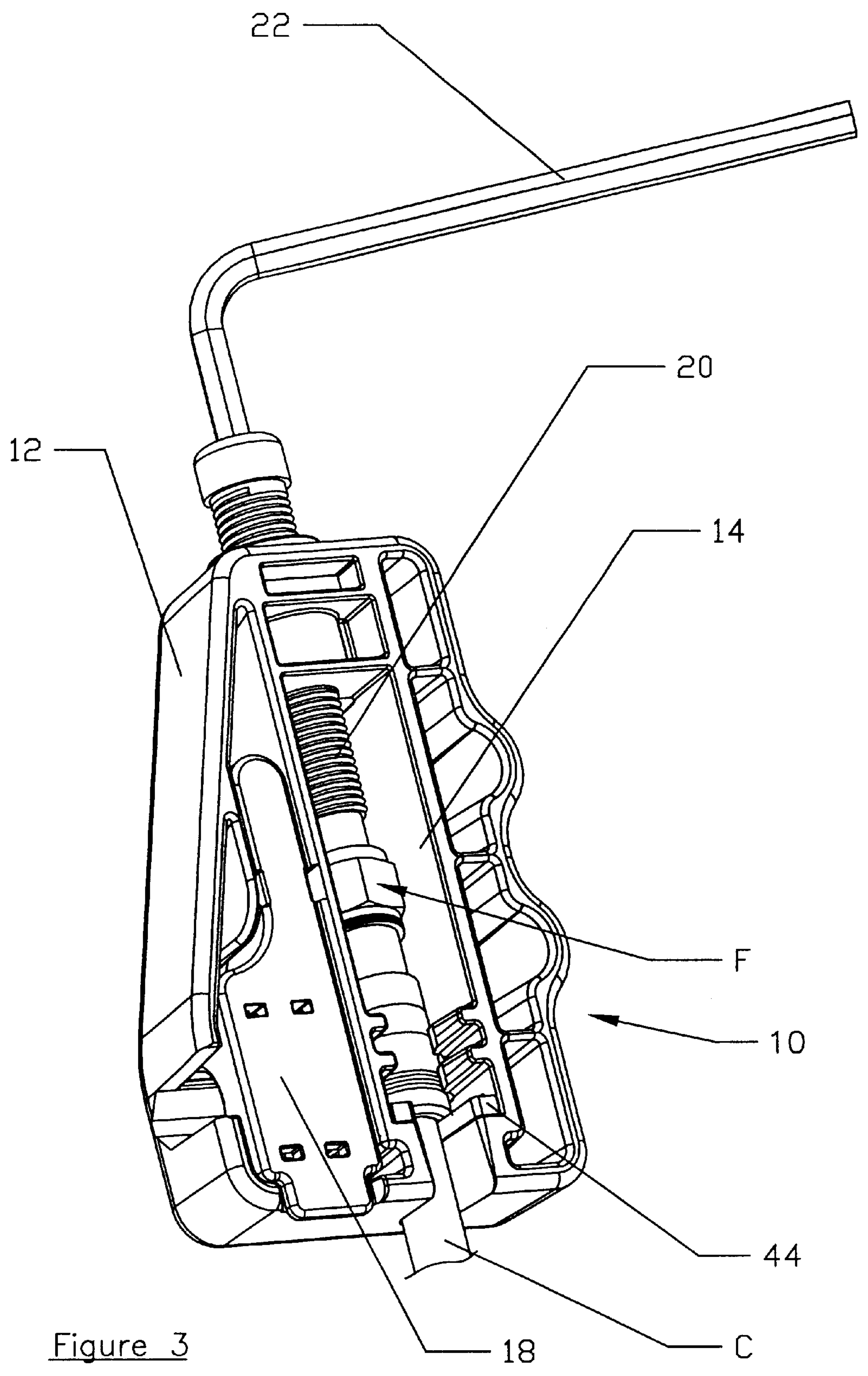
FIG. 3 is another isometric view of the preferred form of tool with a connector positioned in place for the crimping operation.

Referring in more detail to the channel 14, the end wall 26 includes a circular entrance, not shown, which communicates with a vertical slot 32 for insertion of a metal nut 33 into alignment with a tubular guide 34 leading into the intermediate portion of the channel 14. The nut 33 is sized for threaded engagement with the external threaded portion 36 of the bolt 20, and a leading end 21 of the bolt 20 is non-threaded and includes a plastic tip 38 which is inserted into a bore at the tip end of the bolt 20. The channel 14 itself is defined by the bottom panel 24 and interior side walls 40 and 41 and is provided with transverse gussets 42 at opposite ends of the guide 34. A generally U-shaped support bracket or stop 44 is releasably inserted into the channel against a shoulder portion 45 which forms the end of a more restricted generally U-shaped opening 46 in the end wall 25. The bracket 44 has ribs 43 on outer side edges for snap-fit engagement into complementary grooves in the channel so as to securely retain the bracket 44 in position. A pair of closely spaced, vertically extending ribs 48 are disposed in aligned, confronting relation to one another and terminate in spaced relation to the bottom wall 24 so as to retain a cable C against the bottom wall and to assist in guiding the cable into the channel from the entrance 46, for example, as illustrated in FIG. 3. In this relation, the fitting F is assembled onto the end of the cable C once inserted into the channel in preparation for the crimping operation.

A bottom rest or pad 46 is positioned in the channel 14 to assist in maintaining alignment between the bolt 20 and fitting F preliminary to the crimping operation. Additional gussets or reinforcing members 42' extend between the side wall 27 and the inner side wall 41 of the channel to rigidify and strengthen the tool body. For a similar purpose, reinforcing wall 50 extends between the opposite side wall 30 and channel wall 40.

Figure 4:
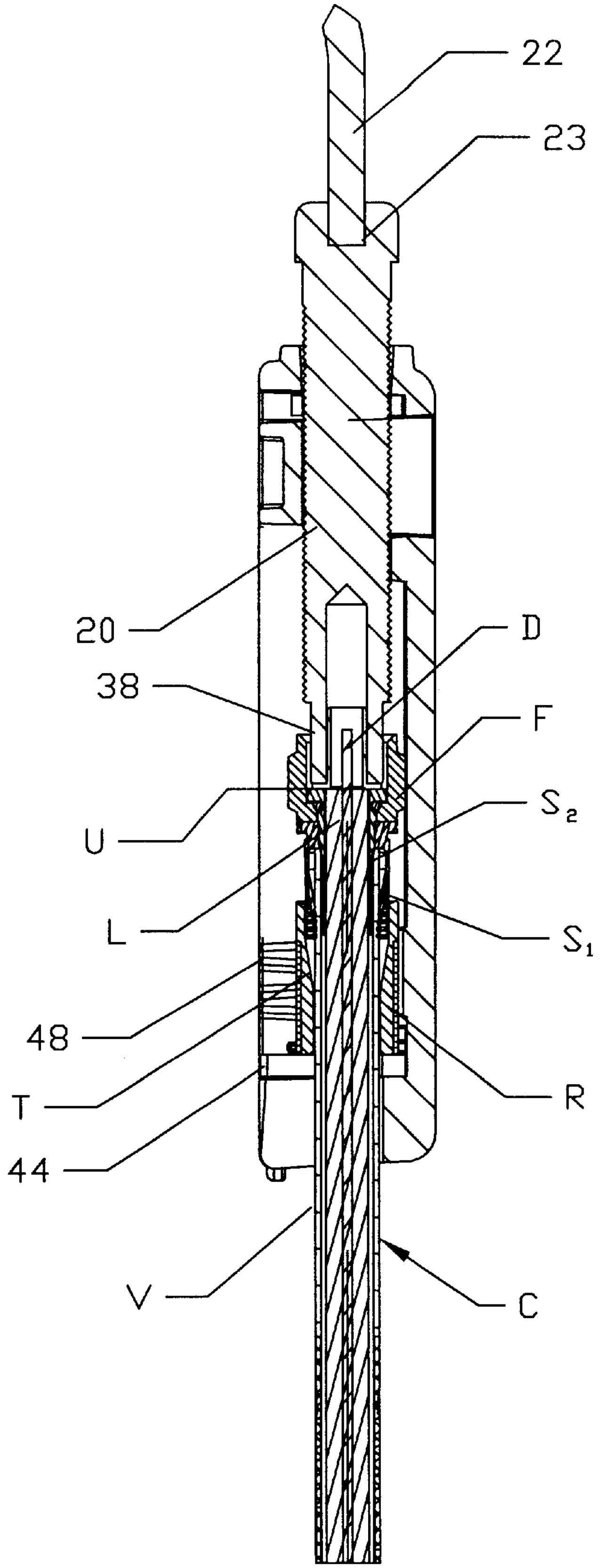
FIG. 4 is a cross-sectional view through the compression bolt and connector in the relationship illustrated in FIG. 3.

In preparing a coaxial cable end, a length of the outer jacket J is stripped from the cable end as well as a second length of the braided connector B and insulator I to expose the leading end of the inner conductor D. A portion of the braided conductor B is folded back over the leading edge of the dielectric outer jacket J. Before the cable end is inserted in the channel, the fitting F is loosely assembled in place with a crimping ring R in surrounding relation to inner and outer sleeves $S_1$ and $S_2$ permitting insertion of the braided conductor B and jacket J into the space between the sleeves, and the crimping ring R extends beyond the sleeves into abutting relation to the bracket 44. The inner sleeve $S_2$ terminates in a seat U, and the cable end is inserted into the sleeves $S_1$ and $S_2$ a sufficient distance that the inner dielectric layer L surrounding the conductor D is flush with the seat U. The loosely assembled cable end is then axially advanced through the entrance 46, bracket 44 and beneath the ribs 48 until the crimping ring R clears the bracket 44. The crimping ring R is then free to drop slightly beneath the lower edge of the bracket 44. In order to carry out the crimping operation, the bolt 20 is threadedly advanced until the end portion 38 abuts the seat U and the conductor D is inserted into the end portion or tip 38 as illustrated in FIG. 4. Continued threaded advancement of the bolt 20 by turning of the handle or wrench 22 will cause the outer sleeve $S_1$ to advance along the inner tapered surface T of the crimping ring R so as to compress the sleeve $S_1$ radially and inwardly into positive crimping engagement with the cable end, the crimping ring R being held against axial movement by the bracket or stop 44. The relatively wide flat configuration of the body 12 facilitates gripping of the tool in one hand while the wrench 22 is being rotated with the other hand in crimping the assembly together without a vice or other special anchoring device. In addition, the use of a threaded crimping element in the form of the bolt 20 makes it self-compensating for different lengths of fittings F.

Figure 5:
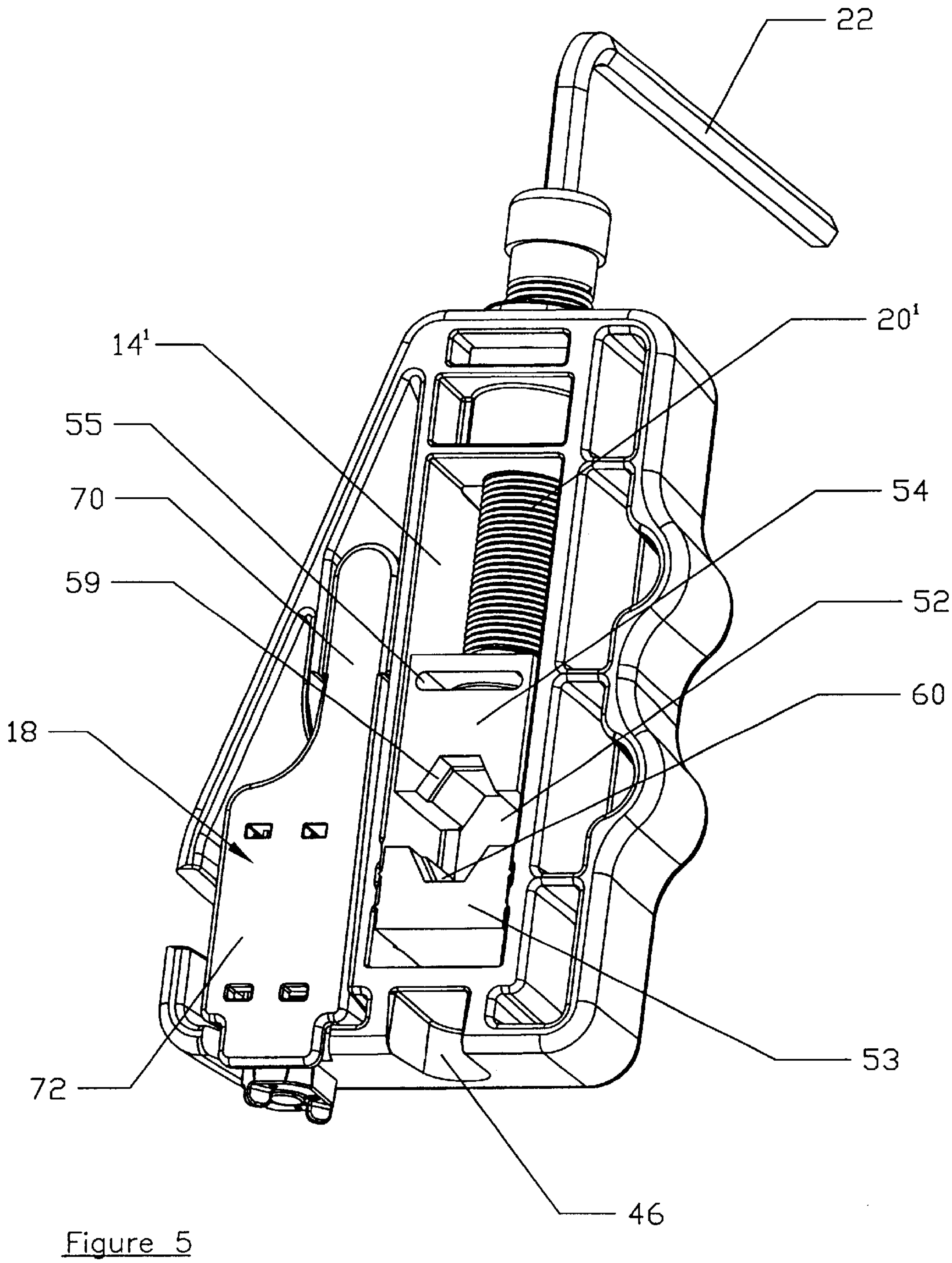
FIG. 5 is another isometric view of a second preferred form of tool illustrating the mounting of hexagonal crimping dies in the tool for carrying out hexagonal crimping operations.
Figure 6:
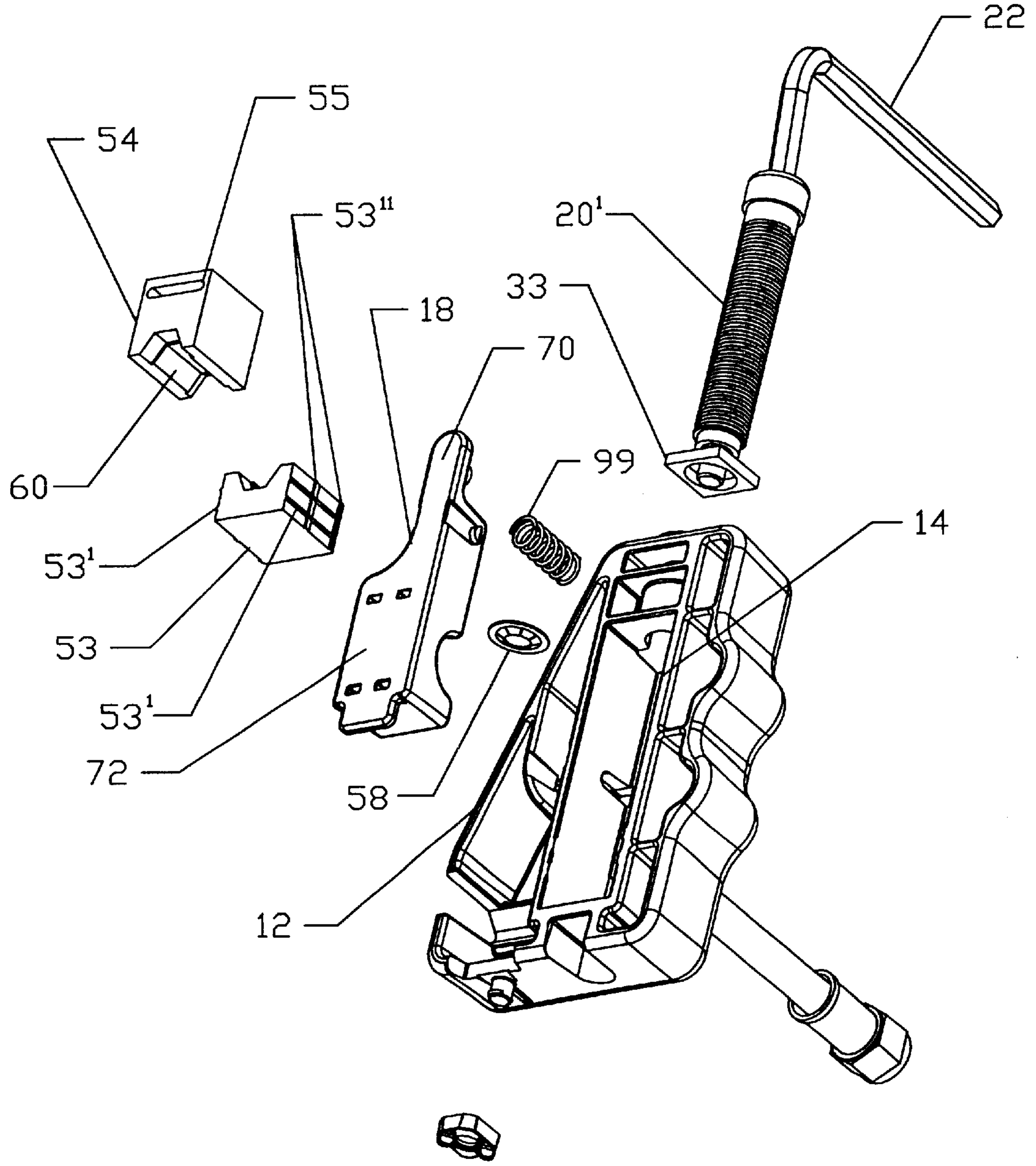
FIG. 6 is an exploded view of the form of invention shown in FIG. 5.
Figure 7:
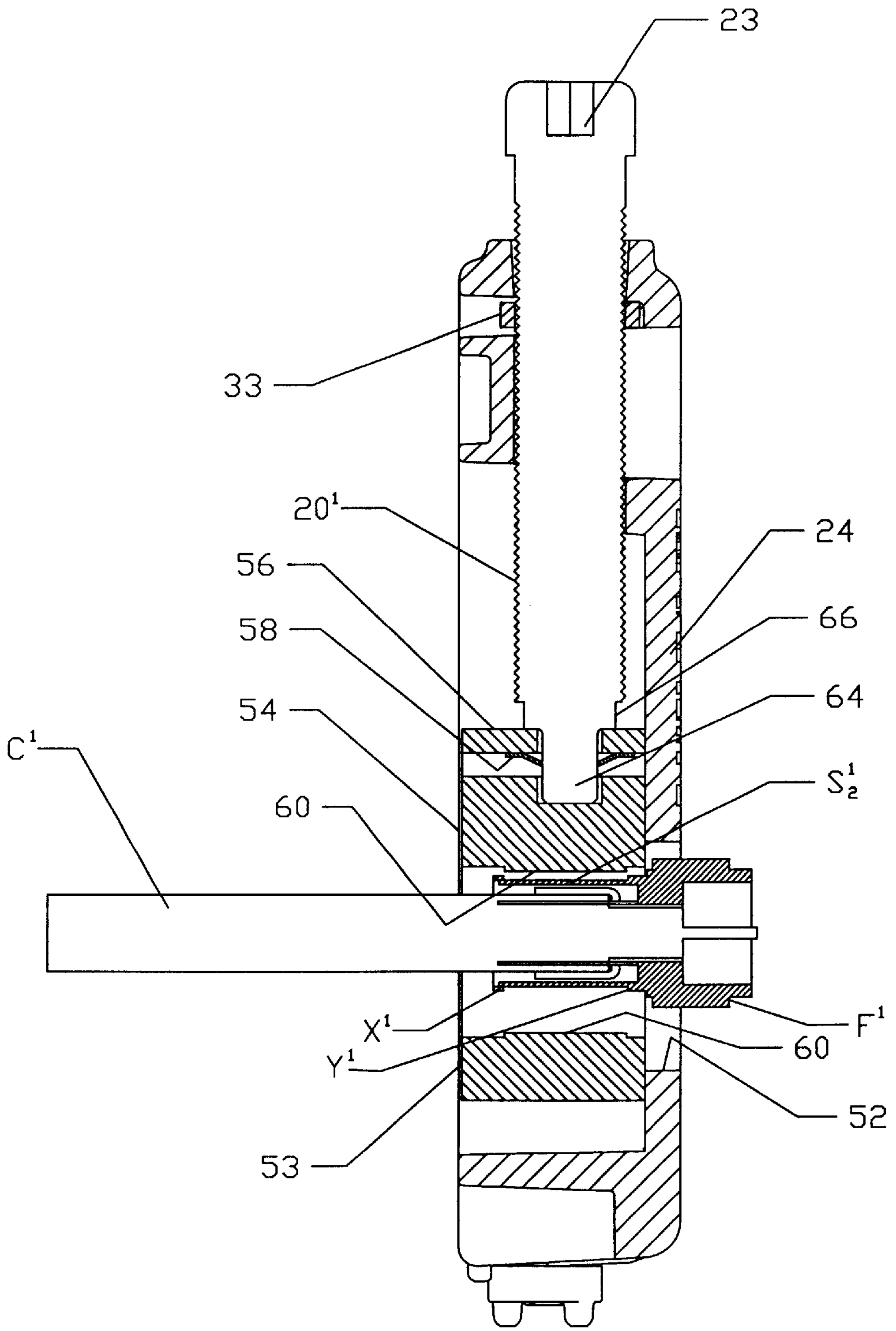
FIG. 7 is a cross-sectional view of the second preferred form of tool illustrating a connector in place for a hexagonal crimping operation.
Figure 7A:
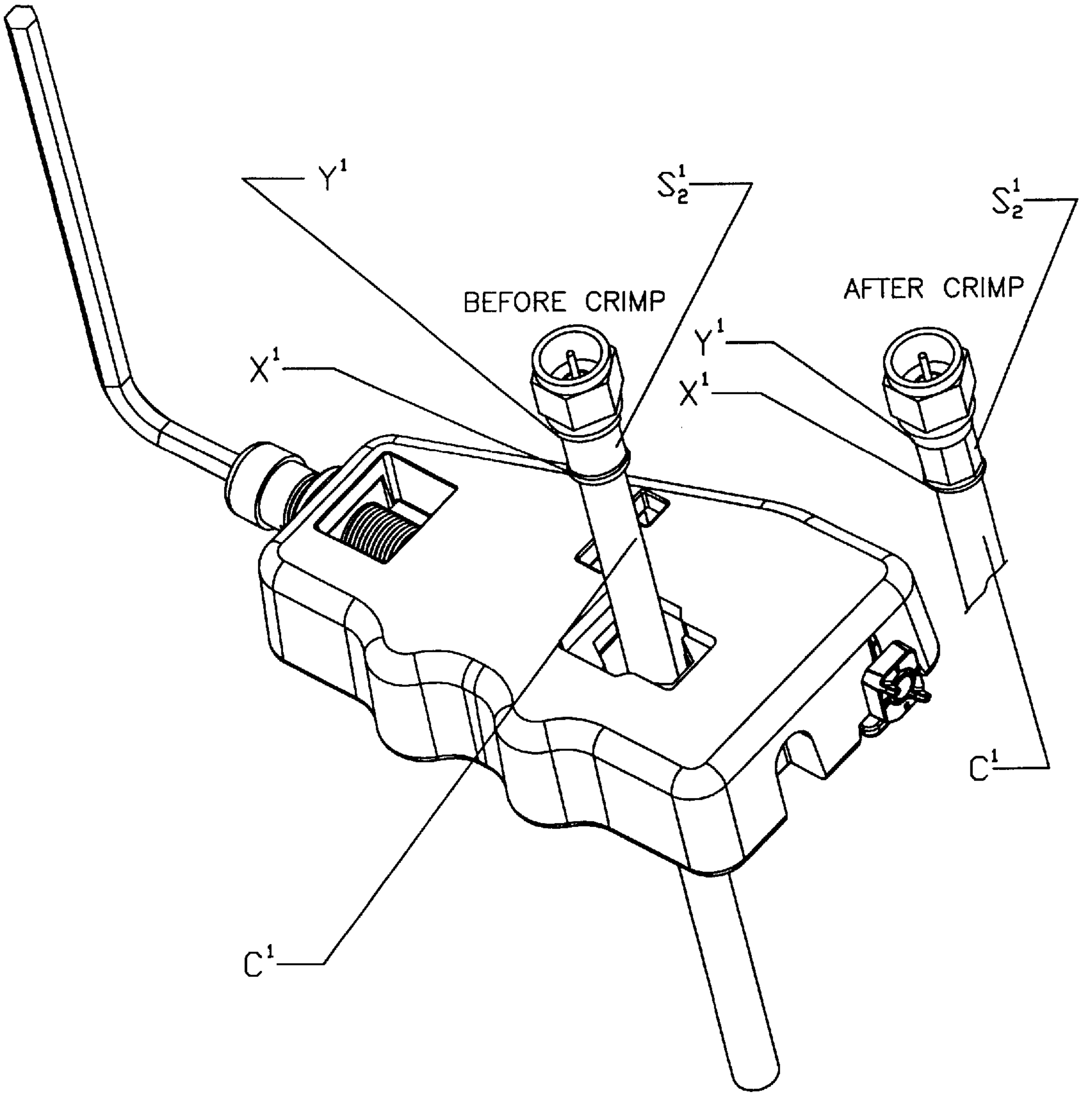
FIG. 7A is a perspective view of the alternate form of invention illustrating the hex crimp connector before and after crimp.
Figure 10:
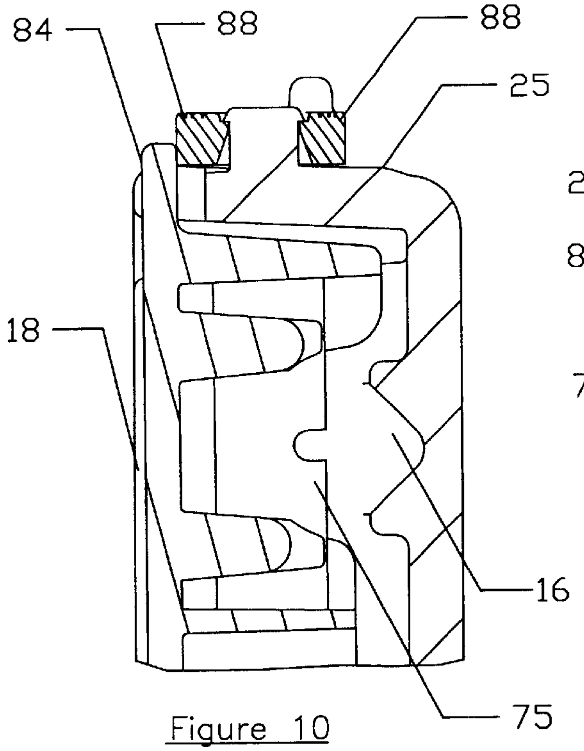
FIG. 10 is an enlarged cross-sectional view of the stripper section of the tool.

An alternate preferred form of invention is illustrated in FIGS. 5 to 7 in which like parts to those of FIGS. 1 to 4 are correspondingly enumerated. Specifically, a main channel 14' is provided with an opening 52 in the bottom wall 24, and a pair of hexagonal crimping dies 53 and 54 are positioned in the channel 14' on diametrically opposed sides of the opening 52 and in confronting relation to one another. Thus, each of the dies 53 and 54 is correspondingly of three-sided configuration, the die 53 being retained by mutually perpendicular pairs of ribs 53' and 54" which mate with complementary grooves in opposite sides 40 of the channel 14'; and the die block 54 is slotted at 55 and provided with a bore 56 for insertion of leading end 64 of the bolt 20' and which is retained in journaled relation to the block 54 by a speed fastener 58. The leading end 64 is modified somewhat from the leading end 21 of the bolt 20 of the first preferred form in that it does not require the separate tip 38 but is provided with a shoulder 66 which bears against the end of the die block 54. Accordingly, the die block 53 is fixed in position within the channel but the die block 54 is slidable under the control of the bolt 20' toward and away from the die 53. In addition, the dies 53 and 54 have three-sided surfaces 59 which are in facing relation to one another directly above the opening 52 and the dies 53 and 54 have inset portions 60 along their three-sided facing surfaces 59 so as to indent each outer sleeve $S_2'$ between opposite ends X' and Y' into a hexagonal configuration as best seen from FIG. 7A.

The hexagonal crimping operation is performed by inserting the end of a cable C' between the dies 53 and 54 and loosely assembling a fitting F' which corresponds to the fitting F but without the crimping ring R of the first preferred form. As before, the sleeves $S_1'$ and $S_2'$ receive the inner dielectric layer L of the cable end, and the outer sleeve $S_2'$ undergoes radial contraction into a hexagonal configuration between ends X' and Y' when the die 54 is axially advanced through the channel to compress the sleeve $S_2'$ against the stationary die 53. The die 54 is then backed off by unthreading the bolt 20', and the assembled cable C' and fitting F' are removed from the passage between the dies.

Figure 8:
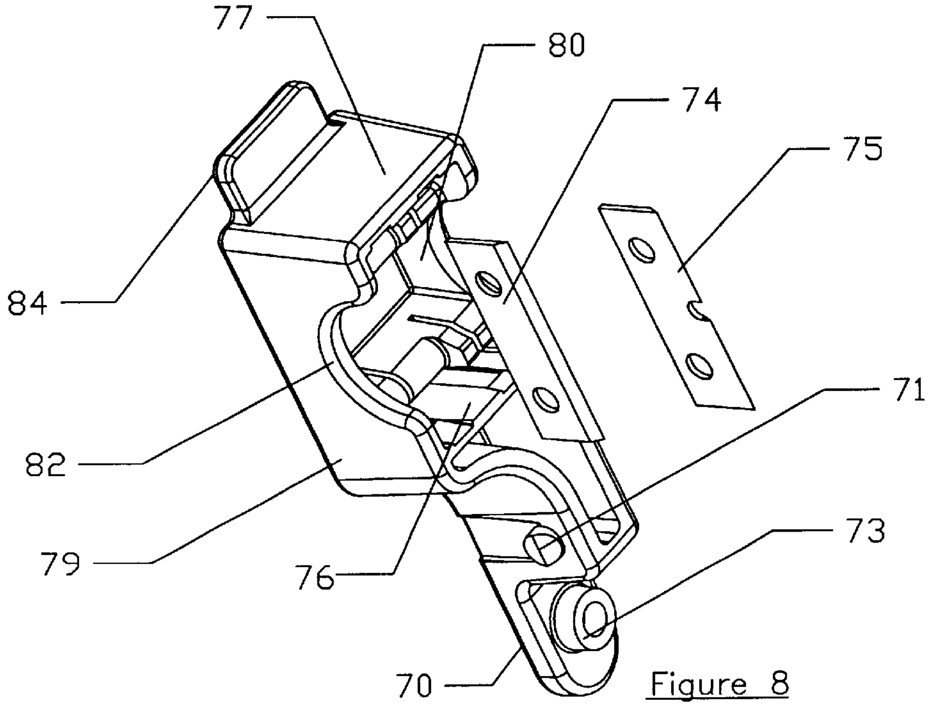
FIG. 8 is an exploded view of a portion of the cable stripper for the preferred forms of invention.

Another important feature of the invention resides in the stripper portion of the tool which is built into the wider side of the body 12 and broadly includes the stripper channel 16 which extends through the side wall 12 in a direction transversely of the main channel 14 and in close proximity to the end wall 25. The channel 16 is sized to accommodate each cable end C or C' for the purpose of stripping off selected layers of the cable end preliminary to the crimping operation as previously described in connection with FIGS. 3 and 4. Referring in particular to FIG. 8, the stripper jaw or plate 18 has a relatively narrow end 70 which is pivotally secured by slight protuberances or bosses 71 on opposite side panels of the stripper jaw and which are inserted into snap-fitting relation in complementary depressions 40' and 50' in wall portions 40 and 50, respectively, of the body 12; and a relatively wide end 72 which retains a pair of stripper blades 74 and 75 in a pair of opposed slots in the spaced end walls 76 and 77 on the underside of the wider portion 72. Another boss 73 on the underside of the lever end 70 receives the end of a spring member 99 to be hereinafter described. Opposed side walls 79 and 80 are provided with generally circular recessed portions 82 which when assembled are disposed in downwardly facing relation to the channel 16. The wider portion 72 also includes an overhang 84 which projects beyond the end wall 25 of the body.

Figure 11:
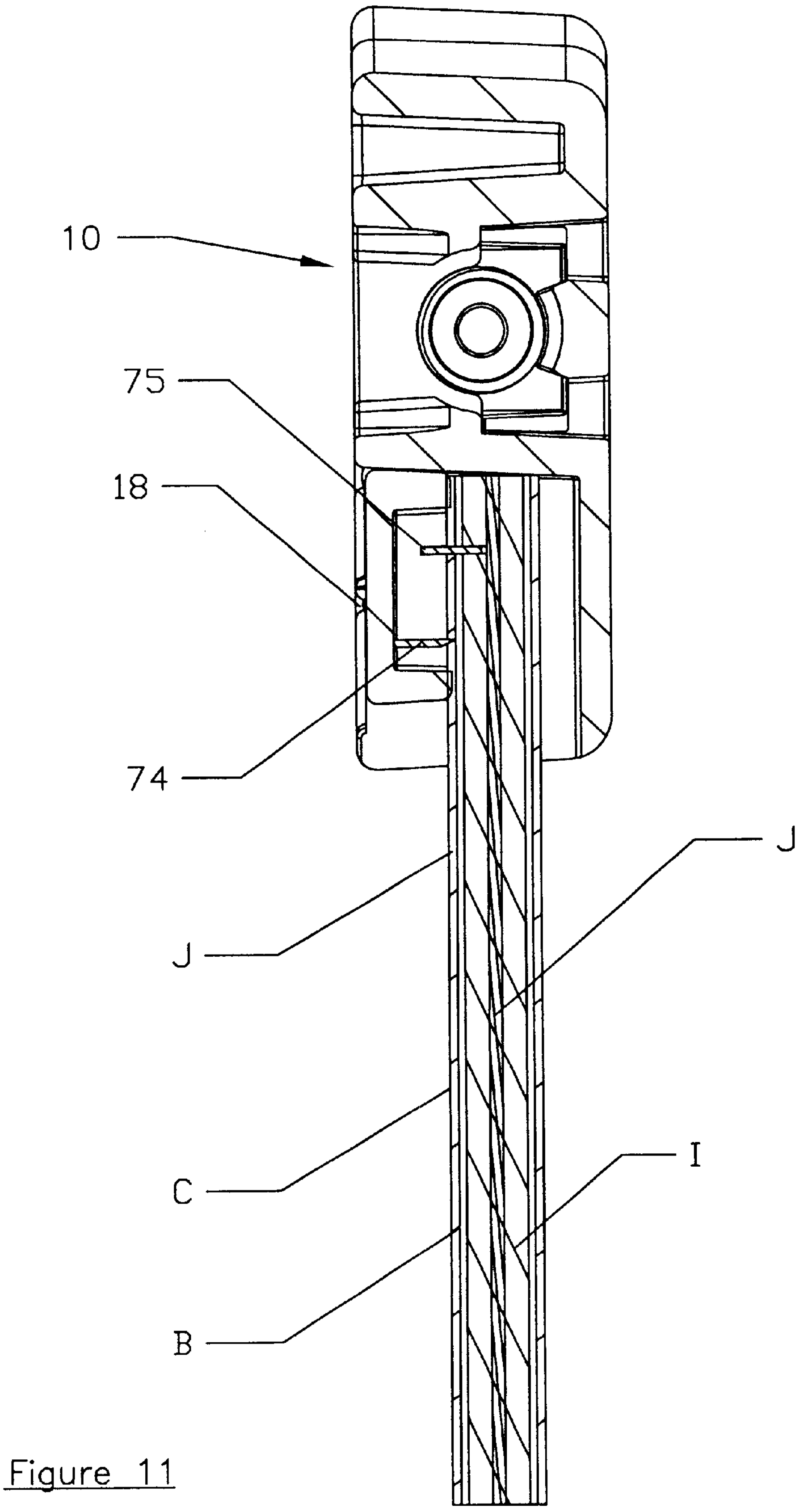
FIG. 11 is a sectional view taken through the end of the tool containing the stripper section and illustrating the positioning of the blades with respect to a cable end.

As best seen from FIG. 11, the stripper blades 74 and 75 project downwardly for different selected distances according to the depth of penetration required to strip off different layers of a cable end. Thus, the blade 75 is positioned to penetrate through the entire thickness of the cable end down to the inner conductor D so as to expose the leading end of the conductor D as described. In turn, the blade 74 extends for a distance sufficient only to strip off the outer jacket J an additional distance behind the blade 75 so as to expose the braided layer B and permit it to be doubled back over the inner dielectric layer L.

Figure 9:
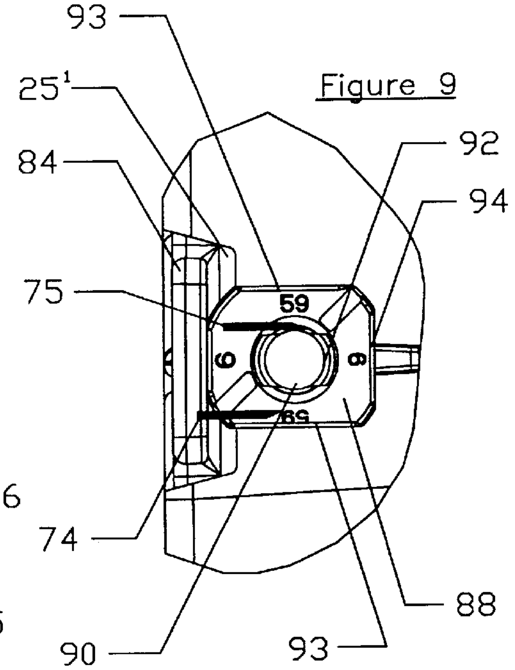
FIG. 9 is an end view of an adjustable blade control switch.

In order to adjust the blade height for different sized fittings F, such as, the "6" and "59" sized fittings used in the coaxial cable television trade, an adjustable limit stop 88 is pivotally mounted on a pin 90 on the end wall 25 of the body 12. The pin 90 has flanged portions 92 to retain the limit stop 88 in position on the pin but permit it to rotate about the pin to different selected settings according to the size fitting to be assembled onto the cable end. For example, the "59" size fitting requires a greater depth of penetration of the blades 74 and 75 into the cable than the size "6" fitting and therefore the sides of the stop which bear the number "59" are narrower than the sides which bear the number "6". As a result, in the relationship shown in FIG. 9, the side for the number "6" fitting which terminates in edges 94 will project a greater distance above the recessed edge 25' than the sides for the number "59" fitting so that the stripper plate 18 and specifically its leading end 84 will be limited in its downward movement by the upper edge of the limit stop 88 to a greater extent than when one of the sides for the size "59" fitting is rotated into position. In this relation, the lever end 70 is spring-loaded by a coiled tension spring 99 mounted on the boss 93 and extending downwardly into the cavity of the body to bear against the bottom wall 24 and urge the opposite end 84 of the stripper jaw 18 downwardly to force the blades 74 and 75 into engagement with the cable end.

It will be apparent that different types of limit stops or controls may be employed in place of the limit stop 88, such as, arm members of different length which can be selectively rotated into position beneath the stripper plate 18 or an adjustable slide member or eccentric member which can be selectively advanced into position beneath the stripper plate. As a further alternative, the adjustable stop member may be positioned at the lever end of the stripper plate to regulate the blade height.

In practice, the stripper plate lever end 70 is depressed against the urging of the spring 99 to raise the portion 72 so that the cable end can be inserted into the channel 16 until it abuts the side wall 40 of the channel 14. When the lever end 70 is released, the spring 99 will cause the blade 74 to move into engagement with the cable and to cut through the cable as the tool body 12 is rotated about the cable approximately two to three times in each direction while holding the cable firmly in place. During this procedure, the blade 75 will move into engagement with the cable and cut through the outer jacket layer of the cable as the blade 74 continues to cut down to the inner conductor D. If necessary, manual pressure may be applied along with spring pressure to force the blades 74 and 75 through the layers of cable. Once the leading end 84 of the stripper plate 18 abuts against the limit stop, the cable end is then pulled out of the channel and the blade members 74 and 75 will cause the layers to be stripped off of the cable. The lever end 70 is then depressed once again to permit the stripped layers to be removed from the channel 16 and discarded. The leading end of the conductor D is therefore exposed along with the braided conductor layer B, and the exposed portion of the layer B is folded back over the outer jacket layer preliminary to inserting the cable into the channel 14 as previously described. The same procedure is followed in preparing a cable C' for hexagonal crimping as described in conjunction with FIGS. 5 to 7.

There are definite advantages in utilizing the leverage or mechanical advantage afforded by the tool body in rotating the crimping bolt 20 with respect to the tool body for either of the crimping operations as well as for rotating the tool body with respect to the cable for the stripping operation. The tool body can be molded out of a high strength rigid plastic material to be of one-piece construction, and certain of the major load-bearing members including the nut 33 and limit stop 44 as well as the crimping bolt 20 and spring 99 are preferably composed of appropriate metal compositions.

It is therefore to be understood that while preferred and alternate forms of invention are herein set forth and described, the above and other modifications and changes may be made in the construction and arrangement of parts as well as selection of materials without departing from the spirit and scope of the present invention as defined by the appended claims and reasonable equivalents thereof.

We claim:

1. A multipurpose tool wherein a cable is loosely assembled with a cable fitting at one end of said cable and a crimping ring is loosely assembled over a sleeve extension of said cable fitting, said tool comprising in combination:

a hand held body portion having a first channel extending through said body portion having a cable-receiving opening at one end of said channel and terminating in a crimping member-receiving opening at an opposite end of said channel, and a second channel extending transversely of said first channel;

anchor means including an end stop mounted in said channel for limiting axial movement of said crimping ring toward said cable-receiving opening; and a crimping member insertable through said crimping member-receiving opening into engagement with said crimping ring, and force-applying means for axially advancing said crimping member toward said end stop whereby to cause said crimping ring to contract said sleeve into crimping engagement with said cable end.

2. A multipurpose tool according to claim 1 wherein said crimping member is in the form of an elongated stem insertable through said crimping member-receiving opening.

3. A multipurpose tool according to claim 2 wherein said force-applying means is defined by a fixed threaded portion in said channel threadedly engageable with said stem whereby said stem is axially movable through said channel in response to relative rotation between said stem and said body.

4. A multipurpose tool according to claim 3 wherein said fixed threaded portion is defined by a nut through which said stem is threadedly advanced.

5. A multipurpose tool according to claim 1 wherein said crimping member is in the form of a threaded stem having a cable-engaging pin journaled at a leading end of said stem.

6. A multipurpose tool according to claim 1 wherein said body includes crimping dies mounted in said second channel.

7. A multipurpose tool according to claim 6 wherein said second channel intersects said first channel and said crimping dies are releasably positioned in said second channel.

8. A multipurpose tool according to claim 7 wherein one of said crimping dies is fixed against axial movement with respect to said first channel and another of said crimping dies is axially movable toward and away from said one crimping die.

9. A multipurpose tool according to claim 8 wherein said crimping dies have three-sided die surfaces, and a second cable-receiving opening is aligned for insertion of a cable between said die members.

10. In a coaxial cable tool wherein a coaxial cable is loosely assembled with a cable fitting at one end of said cable and a crimping ring is loosely assembled over a sleeve extension of said cable fitting, the improvement comprising in combination:

an elongated hollow body having a bottom wall, side and end walls and a channel having opposite side walls spaced from said side walls of said elongated hollow body extending lengthwise of said body to terminate in a cable-receiving opening at one end;

anchor means including an end stop mounted in said channel for limiting axial movement of said crimping ring towards said cable-receiving opening; and a crimping member insertable in said channel into engagement with said end of said cable, and force-applying means for axially advancing said crimping member toward said end stop whereby to cause said crimping ring to contract said sleeve into crimping engagement with said cable end.

11. In a coaxial cable tool according to claim 10 wherein said crimping member is in the form of an elongated stem insertable through a crimping member-receiving opening.

12. In a coaxial cable tool according to claim 11 wherein said force-applying means is defined by a fixed threaded portion in said channel threadedly engageable with said stem whereby said stem is axially movable through said channel in response to rotation of said stem.

13. In a coaxial cable tool according to claim 12 wherein said fixed portion is defined by a nut releasably insertable in said channel through which said stem is threadedly advanced.

14. In a coaxial cable tool according to claim 10 wherein said crimping member is in the form of a threaded stem having a cable-engaging pin journaled at a leading end of said stem.

15. A multipurpose coaxial cable tool comprising:

a low profile, elongated hollow body of generally polygonal configuration having a bottom wall and outer side walls;

a first channel extending lengthwise of said body and opening in a direction away from said bottom wall and terminating in a crimping member-receiving opening at one side wall of said body;

a second channel extending transversely of said first channel through said bottom wall having crimping dies mounted therein; and a third channel having a cable-receiving opening in another side wall of said body for insertion of a cable to be stripped therein; and a jaw having at least one stripping blade and means pivotally mounting said jaw for movement between open and closed positions with respect to said channel whereby to strip an end of a cable inserted therein preliminary to assembly of a fitting on said cable in one of said first and second channels.

16. In a tool according to claim 15 wherein said body includes crimping dies releasably positioned in said second channel.

17. In a tool according to claim 16 wherein one of said crimping dies is fixed against axial movement with respect to said first channel and another of said crimping dies is axially movable toward and away from said first crimping die, said crimping dies having three-sided die surfaces, and said bottom wall includes a cable-receiving opening aligned for insertion of a cable between said die members.

18. In a tool according to claim 15 wherein a crimping member is in the form of an elongated stem insertable through an opening in said body at one end of said first channel, and a nut threadedly engageable with said stem in said channel, and a leading end of said stem imparting slidable movement to one of said crimping dies through said first channel.

19. A coaxial cable tool wherein a cable is loosely assembled with a cable fitting at one end of said cable and a crimping ring is loosely assembled over a sleeve extension of said cable fitting, said tool comprising in combination:

a low profile, elongated hollow body of generally polygonal configuration having a bottom wall and opposite end walls;

a channel having opposite side walls spaced from said side walls of said elongated hollow body extending lengthwise of said body, said channel opening in a direction away from said bottom wall and including a crimping member-receiving opening in one of said end walls of said body with a cable-receiving opening in communication with said channel;

anchor means mounted in said channel for engagement with said crimping ring;

a crimping member insertable through said one end wall into engagement with said crimping ring, and force-applying means for advancing said crimping member toward said anchor means whereby to cause said crimping ring to contract said sleeve into crimping engagement with said sleeve extension.

20. A tool according to claim 19 wherein said body includes an opening communicating with said channel in axially spaced relation to said crimping member-receiving opening, and a pair of crimping dies adapted to be mounted in said channel in surrounding relation to said sleeve extension.

* * * * *